July 20, 1943.  R. C. HOFFMAN  2,324,703
MOTOR VEHICLE
Filed Dec. 26, 1941
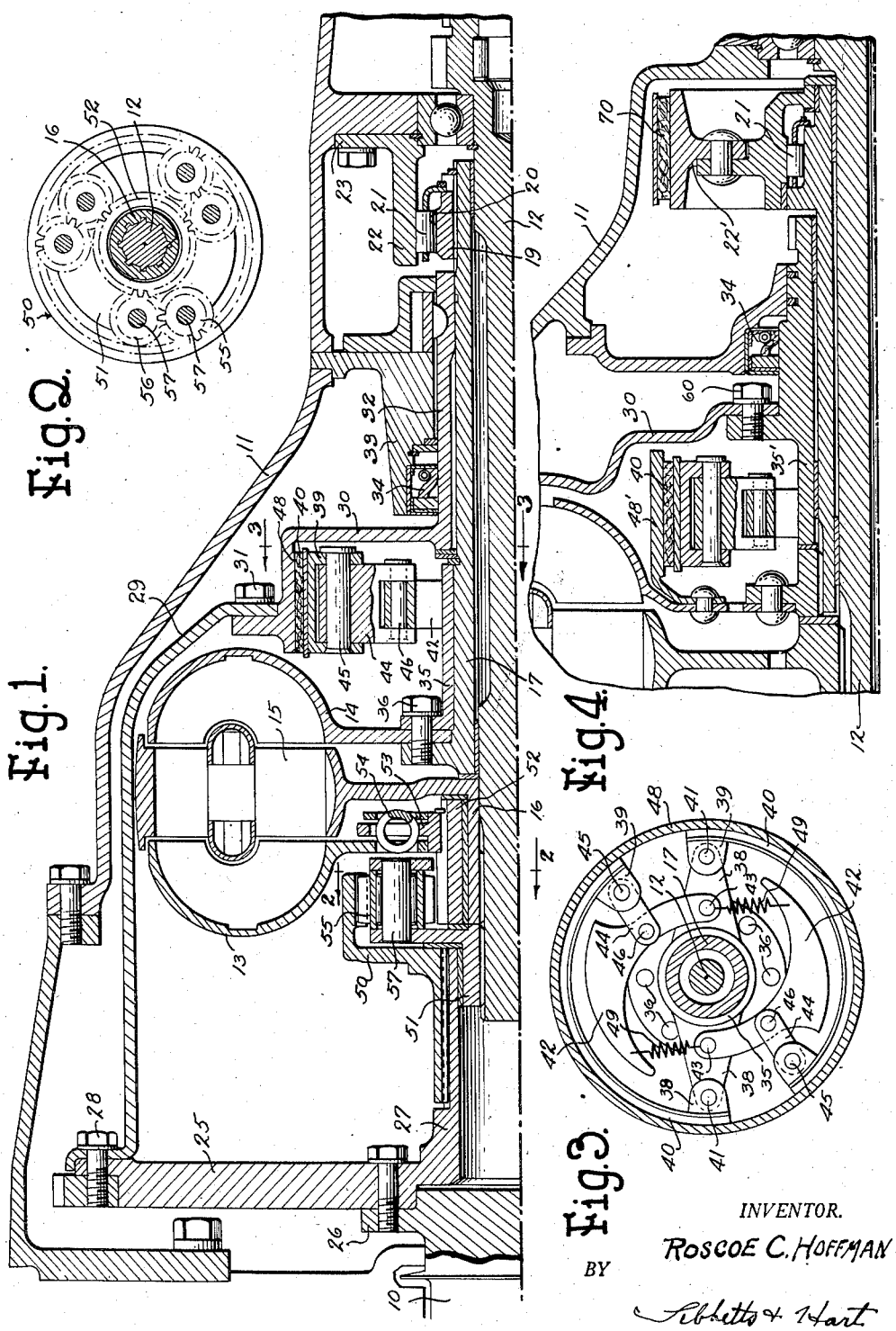
INVENTOR.
ROSCOE C. HOFFMAN
BY
Tibbetts & Hart
Attorneys Patented July 20, 1943

2,324,703

UNITED STATES PATENT OFFICE 2,324,703

MOTOR VEHICLE

Roscoe C. Hoffman, Detroit, Mich., assignor to Packard Motor Car Company, Detroit, Mich., a corporation of Michigan Application December 26, 1941, Serial No. 424,488

5 Claims. (Cl. 74—189.5)

This invention relates to transmissions and more particularly to transmissions that include a hydraulic torque converter.

An object of the invention is to provide a transmission with a fluid driving coupling that can be automatically controlled to operate as a torque converter or as a fluid clutch in order to secure maximum efficiency during varying operating conditions.

Another object of the invention is to provide a transmission in which a torque converter is automatically controlled to operate as a fluid clutch above a predetermined speed of the power source.

A further object of the invention is to provide a motor vehicle transmission in which a hydraulic torque converter is controlled to operate as a fluid clutch by means responsive to certain driving torque requirements.

Still another object of the invention is to provide a motor vehicle transmission in which planetary gearing is utilized to provide a divided drive from a power member that passes through a controlled hydraulic torque converter in one path to the driven member and in another path directly to the driven member.

Other objects of the invention will appear from the following description taken in connection with the drawing, which form a part of this specification, in which:

Fig. 1 is a fragmentary sectional view of a transmission incorporating the invention;

Fig. 2 is a sectional view of the planetary drive gearing taken on line 2—2 of Fig. 1;

Fig. 3 is a sectional view of the coupling between the reaction member and the power means taken on line 3—3 of Fig. 1;

Fig. 4 is a fragmentary sectional view of a transmission showing the invention in a modified form.

The transmission shown in the drawing is especially adapted for driving motor vehicles but is capable of use for other purposes. A power drive shaft 10, which can be an engine crank shaft, projects into one end of transmission casing 11 and driven shaft 12 projects into the other end of the casing. These shafts are preferably in alignment and the driven shaft can be connected to drive road wheels of a motor vehicle (not shown).

A hydraulic torque converter, consisting generally of impeller 13, reaction member 14 and driven member 15, is arranged in the casing and serves as one of two driving couples between the shafts. The hub 16 of the driven member is splined to the driven shaft while the reaction member is fixed to sleeve 17 rotatably mounted on the driven shaft. Fixed on the sleeve is a ring member 19 having peripheral cam surfaces, as indicated at 20, engaged by rollers 21 which bear against a circular abutment flange 22 extending from interior wall 23 of the casing. Flywheel 25 is fixed to flange 26 on the drive shaft and is formed with a sleeve 27 extending axially on a forward portion of the driven shaft. A housing composed of sections 29 and 30 secured together by bolts 31 is attached to the flywheel by bolts 28. Section 30 of the housing terminates in a sleeve 32 that surrounds the reaction sleeve 17 and projects through bearing wall 33 in the casing. The bearing wall carries a suitable seal 34 to prevent escape of fluid along the exterior of sleeve 32. A clutch sleeve 35 is fixed to the reaction member by bolts 36 and such bolts can be employed to fasten sleeve 17 to the reaction member. The flywheel and housing provide an enclosure for the main portion of the torque converter.

Power is transmitted from the drive shaft to planetary gearing from which it flows to the driven shaft in two paths, one path being directly through the gearing and the other path being through the torque converter. The planetary gearing includes ring gear 50 splined to flywheel sleeve 27, planet carrier 51 splined to the driven shaft and sun gear 52 rotatably mounted on the hub of the torque converter driving member. The sun gear carries a driving element 53 which is coupled to the impeller by springs, as indicated by numeral 54. Pairs of meshing planet pinions, each consisting of pinions 55 and 56, are rotatably mounted on pins 57 fixed to the carrier. Pinions 55 mesh with the ring gear and pinions 56 mesh with the sun gear. This arrangement of the pairs of pinions will cause the impeller to be driven in the same direction as the drive shaft.

The fluid driving arrangement so far described will function as a hydraulic torque converter whereby power is multiplied until some speed is reached at which forces acting against the reaction member will cause it to rotate at approximately the same speed and in the same direction as the impeller. During such condition the drive reaches approximately 1:1 through the torque converter except for slippage which varies in accordance with design but in any case the slippage reduces efficiency below that desired. In order to decrease the slippage of torque converters and thereby improve their efficiency, I propose to provide a device for automatically causing the converter to function as a fluid clutch through locking the impeller and the reaction member together.

Such a device is shown as comprising a clutch that is responsive to torque demand, as shown in Figs. 1 to 3 inclusive, and responsive to driving speed as shown in Fig. 4. The same clutch can be employed for both forms of the invention and includes a pair of arms 38 that extend from sleeve 35 in Figs. 1 to 3, inclusive, and from sleeve 35' in Fig. 4 and are pivotally connected with ears 39 on brake shoes 40 by pins 41. Weight members 42 are anchored to the arms by pins 43 and are connected to the shoes by links 44, the links being pivoted on pins 45 fixed to the ears 39 and pivoted on pins 46 fixed on the weight members. Springs 49 are anchored to pins 43 and engage the weight members to restrain their outward movement.

In the clutch device shown in Figs. 1 to 3 inclusive, the clutch is anchored to the reaction member sleeve and is adapted to engage a drum 48 formed on the housing section 30. When the power drive shaft is put in operation, the reaction member tries to turn in a reverse direction but is held stationary by rollers 21 wedging between the abutment 22 and cam member 19, and this condition exists as long as the torque required to drive the vehicle is greater than the output torque of the drive shaft and while the reaction member is tending to rotate in the reverse direction. When the reaction member picks up speed and rotates with the impeller, centrifugal force will move the weight members 42 outwardly to engage the brake shoes 40 with the drum 48 thereby holding the reaction member with the housing so that the reaction member rotates at substantially the same speed as the impeller. When the clutch is engaged, the impeller and the reaction member function as the driving part of a fluid clutch in which the driven member is the driven part.

When the transmission is operating with the torque converter functioning as a fluid clutch, reduction of the tail shaft speed, due to unfilled driving torque demand, tends to cause reverse rotation of the reaction member and reduction of centrifugal force exerted upon the weight members. When this force tending to drive the reaction member rearwardly becomes sufficient to overcome the friction of the brake members on the drum, the brake members will first slip and then release. The reaction member will then be held from reverse rotation by the rollers 21. The operating speeds at which this clutch release takes place varies depending upon driving torque requirements and speed of the converter unit. In other words, the clutch is released whenever the driving torque requirement is more than the delivered torque below a certain speed of the converter unit. In any case, the clutch will release below a certain speed of the unit as dictated by the force of springs 49.

In the modified form of the invention shown in Fig. 4, the automatic clutch device is arranged to engage with the same elements as in the previously described embodiment of the invention, but is attached to be responsive entirely to the speed of the drive shaft. The clutch is anchored on sleeve 35' which is fixed to the housing section 30 by bolts 60 and the brake members 40 are arranged to engage a drum 48' fixed to the reaction member. Above some predetermined speed of the drive shaft, centrifugal force will hold the brake members in engagement with the drum and below such speed the brake members will release from the drum. In this form of the invention the drum 22' engaged by the reaction rollers can be held or released by brake 70, the brake being normally applied.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a transmission, a power drive shaft; a driven shaft; a hydraulic torque converter having an impeller, a reaction member and a driven member, said driven member being fixed to the driven shaft; planetary gearing having a ring gear coupled to the drive shaft, a planet carrier fixed to the driven shaft and a sun gear fixed to the impeller; and coupling means including a housing surrounding the torque converter and fixed to rotate with the drive shaft and a centrifugal clutch for holding the reaction member and the housing locked together while the reaction member is operating above a predetermined speed.

2. In a transmission, a power drive shaft; a driven shaft; a hydraulic torque converter having an impeller, a reaction member and a driven member; coupling means fixing the driven member to the driven shaft; planetary gearing having a ring gear driven by the drive shaft, a sun gear fixed to the impeller and a planet carrier fixed to the driven shaft; and coupling means including a housing fixed to rotate with the drive shaft and a centrifugal clutch for locking the reaction member with the housing when the housing is rotating above a predetermined speed.

3. In a transmission, a power drive shaft; a driven shaft; a hydraulic torque converter having an impeller, a reaction member and a driven member; means coupling the driven member to the driven shaft; planetary gearing coupling the drive shaft directly with the impeller and the driven shaft; a housing enclosing the torque converter and the planetary gearing fixed to rotate with the drive shaft; and automatic means for holding the reaction member and the housing together during a portion of the conditions encountered during operation of the transmission.

4. In a transmission, a power drive shaft; a driven shaft; a hydraulic torque converter having an impeller, a reaction member and a driven member fixed to the driven shaft; planetary gearing driven by the drive shaft and in direct driving relation with the impeller and with the driven shaft; a housing for the converter and the gearing fixed to rotate with the drive shaft; and clutch means comprising a drum fixed to rotate with the housing, friction members adapted to engage said drum, and centrifugal control means for said friction members anchored to said reaction member.

5. In a transmission, a power drive shaft; a driven shaft; a hydraulic torque converter having an impeller, a reaction member and a driven member; planetary gearing driven by the drive shaft and in direct driving relation with said driven shaft and said impeller; a housing enclosing the converter and the gearing fixed to rotate with the drive shaft; and clutch means comprising a drum fixed to said reaction member, friction members adapted to engage said drum, and centrifugal control means for said friction members anchored to and within said housing.

ROSCOE C. HOFFMAN.